United States Patent
Bai et al.

(10) Patent No.: US 12,230,041 B2
(45) Date of Patent: Feb. 18, 2025

(54) INFORMATION PLAYBACK METHOD AND DEVICE, COMPUTER READABLE STORAGE MEDIUM, AND ELECTRONIC DEVICE

(71) Applicant: Realsee (Beijing) Technology Co., Ltd., Beijing (CN)

(72) Inventors: Jie Bai, Beijing (CN); Min Xiao, Beijing (CN); Yi Zhu, Beijing (CN); Yang Li, Beijing (CN)

(73) Assignee: Realsee (Beijing) Technology Co., Ltd., Beijing (CN)

( * ) Notice: Subject to any disclaimer, the term of this patent is extended or adjusted under 35 U.S.C. 154(b) by 364 days.

(21) Appl. No.: 17/775,937

(22) PCT Filed: Aug. 28, 2020

(86) PCT No.: PCT/CN2020/112004
§ 371 (c)(1),
(2) Date: May 11, 2022

(87) PCT Pub. No.: WO2021/093416
PCT Pub. Date: May 20, 2021

(65) Prior Publication Data
US 2022/0415063 A1 Dec. 29, 2022

(30) Foreign Application Priority Data

Nov. 11, 2019 (CN) .......................... 201911096607.3
Dec. 18, 2019 (CN) .......................... 201911310220.3

(51) Int. Cl.
*G06V 20/64* (2022.01)
*G06T 7/73* (2017.01)
*G06V 10/774* (2022.01)

(52) U.S. Cl.
CPC ................ *G06V 20/64* (2022.01); *G06T 7/75* (2017.01); *G06V 10/774* (2022.01)

(58) Field of Classification Search
CPC ...... G06V 20/64; G06V 10/774; G06V 10/82; G06V 20/20; G06V 40/113; G06T 7/75;
(Continued)

(56) References Cited

U.S. PATENT DOCUMENTS

2008/0262910 A1 10/2008 Altberg
2011/0157218 A1 6/2011 Ptucha
(Continued)

FOREIGN PATENT DOCUMENTS

CN 105915972 A 8/2016
CN 105916022 A 8/2016
(Continued)

OTHER PUBLICATIONS

International Search Report and Written Opinion for PCT Appl. No. PCT/CN2020/112004 mail date Oct. 28, 2020, 9 pages.
(Continued)

*Primary Examiner* — Jose L Couso
(74) *Attorney, Agent, or Firm* — Maine Cernota & Curran (57) ABSTRACT

An information playback method and device, a computer readable storage medium, and an electronic device, relating to the technical field of computers. Said method comprises: performing identification on a spatial image in a 3D model and obtaining an information display device and a display area in the spatial image (201); determining the display position information corresponding to the display area (202); overlaying an information playback layer in the display area according to the display position information so as to play back display information in the information playback layer (203). By overlaying an information playback layer on the information display device in a 3D model, (Continued)

further information exchange can be implemented in the 3D model, so that user can experience a more reality-like scenario in the 3D model, thereby enhancing user experience.

16 Claims, 4 Drawing Sheets

(58) Field of Classification Search
CPC .............. G06T 2219/2004; G06T 19/20; G06T 19/006; G06T 1/60; G06T 19/003; G06T 7/70; G06T 17/00; G06T 19/00; G06T 15/00; G06F 18/214; G06F 3/147; G06F 3/0304; G06F 3/0482; G06F 3/17; G06F 19/255; G06F 19/011; G06F 3/14; G06N 3/08; H04N 13/117; H04N 13/139; H04N 13/279; H04N 13/332; H04N 21/414; H04N 21/41415; H04N 21/47205; H04N 21/4725; H04N 21/8146; H04N 21/816; H04N 21/4312; G02B 2027/14; G02B 2027/0178; G02B 2027/0187; G02B 2027/0138; G02B 27/017; G02B 27/0172; G02B 27/0093; G02B 30/52; G02B 27/01; A63F 13/00; G09G 3/002; G09G 2370/16; G09G 2354/00

See application file for complete search history.

(56) References Cited

U.S. PATENT DOCUMENTS

| | | | |
|---|---|---|---|
| 2012/0154557 A1* | 6/2012 | Perez | G06F 3/017 |
| | | | 348/E13.001 |
| 2013/0271577 A1 | 10/2013 | Watanabe | |
| 2014/0063063 A1 | 3/2014 | Scott et al. | |
| 2016/0026253 A1* | 1/2016 | Bradski | H04N 13/128 |
| | | | 345/8 |
| 2016/0269578 A1 | 9/2016 | Nozawa et al. | |
| 2016/0379417 A1 | 12/2016 | Mount | |
| 2018/0143756 A1* | 5/2018 | Mildrew | G06T 19/003 |
| 2018/0247024 A1* | 8/2018 | Divine | G16H 40/20 |
| 2018/0275410 A1* | 9/2018 | Yeoh | H04N 13/279 |
| 2019/0088004 A1 | 3/2019 | Lucas et al. | |
| 2019/0287495 A1* | 9/2019 | Mathur | G02B 27/0172 |
| 2019/0289341 A1 | 9/2019 | Redol | |
| 2019/0291723 A1 | 9/2019 | Srivatsa et al. | |
| 2019/0310761 A1* | 10/2019 | Agarawala | G06F 3/04817 |
| 2020/0021791 A1* | 1/2020 | Hur | H04N 21/6587 |
| 2020/0154085 A1* | 5/2020 | Zhou | G06T 7/70 |
| 2021/0008413 A1* | 1/2021 | Asikainen | G06F 3/0304 |
| 2021/0295604 A1 | 9/2021 | Xiu | |

FOREIGN PATENT DOCUMENTS

| | | |
|---|---|---|
| CN | 106096555 A | 11/2016 |
| CN | 107430790 A | 12/2017 |
| CN | 107463260 A | 12/2017 |
| CN | 107578477 A | 1/2018 |
| CN | 108470377 A | 8/2018 |
| CN | 108961387 A | 12/2018 |
| CN | 109920065 A | 6/2019 |
| CN | 110111385 A | 8/2019 |
| CN | 111178191 A | 5/2020 |
| JP | 0970030 A | 3/1997 |
| JP | 2008052641 A | 3/2008 |
| JP | 2012150796 A | 8/2012 |
| JP | 2014504413 A | 2/2014 |
| JP | 2016001823 A | 1/2016 |
| WO | 2016164697 A1 | 10/2016 |
| WO | 2021093416 A1 | 5/2021 |

OTHER PUBLICATIONS

Horiuchi Takashi, 2 others, Distance map of deep learning using artificial expansion of horiba eminence and other WO demonstration examples Computer vision and image from object recognition of images, IPSJ Technical Report, Computer vision and image media(CVIM) 2017-CVIM-207[online], Japan, IPSJ, May 3, 2017, pp. 1-7, ISSN2188-8701. and its abstract's machine translation.

Office action and English translation for Korean Application No. 10-2022-7019340 dated Oct. 30, 2024, 11 pages.

Search Report and Written Opinion fof Singapore Application No. 11202204906U, mail date Dec. 24, 2024, 9 pages.

* cited by examiner

INFORMATION PLAYBACK METHOD AND DEVICE, COMPUTER READABLE STORAGE MEDIUM, AND ELECTRONIC DEVICE

RELATED APPLICATIONS

The present application is a national phase application filed under 35 USC § 371 of PCT Application No. PCT/CN2020/112004, with an international filing date of Aug. 28, 2020, which claims priority to Chinese Patent Application No. 201911096607.3, filed on Nov. 11, 2019 and Chinese Patent Application No. 201911310220.3, filed on Dec. 18, 2019. Each of these applications is herein incorporated by reference in their entirety for all purposes.

FIELD OF THE INVENTION

The present disclosure relates to the technical field of computers, in particular to an information playback method and apparatus, a computer readable storage medium, and an electronic device.

BACKGROUND OF THE INVENTION

At present, an Internet technology has brought a lot of convenience to people's life. By using a 3D reconstruction technology, people can experience operations such as shopping, traveling, visiting, and viewing houses without leaving home. Furthermore, in a reconstructed 3D model, a user can be provided with a user experience that is basically the same as an actual scenario. However, as people use a 3D reconstruction scenario more and more, requirements for interaction in the 3D scenario are getting higher and higher, and the current technology lacks interaction when the user browses, and cannot provide the user with more diverse interaction based on the 3D scenario, resulting in very poor user experience.

SUMMARY OF THE INVENTION

The present disclosure is put forward to solve the above technical problem. Embodiments of the present disclosure provide an information playback method and apparatus, a computer readable storage medium, and an electronic device.

An embodiment of the present disclosure provides an information playback method, including: performing identification on a spatial image in a 3D model and obtaining an information display device and a display area in the spatial image; determining display position information corresponding to the display area; and overlaying an information playback layer in the display area based on the display position information to play back display information in the information playback layer.

Optionally, performing identification on the spatial image in the 3D model and obtaining the information display device and the display area in the spatial image include: inputting the 3D model into an image identification model, identifying the information display device and the display area in the spatial image by using the image identification model, and determining positions of the information display device and the display area in the 3D model.

Optionally, the method includes: generating a training sample based on a 3D model sample in which 3D space information of the information display device is calibrated, wherein the display area is calibrated in the 3D space information of the information display device; and training a preset deep learning model by using a deep learning method and based on the training sample to obtain the image identification model.

Optionally, determining the display position information corresponding to the display area includes: obtaining 3D point cloud information corresponding to the 3D model; and determining the display position information based on the 3D point cloud information and a position of the display area in the 3D model, wherein the display position information includes: spatial coordinates in the 3D model.

Optionally, playing back the display information in the information playback layer includes: obtaining current virtual user visual field information, wherein the visual field information includes current position information of a virtual user and visual angle range information of the virtual user; judging whether the information display device is within a visual field range of the virtual user; and loading the display information on the information playback layer and playing back automatically, or playing back in response to a playback command of a user if the information display device is located within the visual field range of the virtual user.

Optionally, judging whether the information display device is within the visual field range of the virtual user includes: obtaining spatial coordinates of end points of the information display device in the 3D model; and determining that the information display device is within the visual field range of the virtual user when the number of the spatial coordinates of the end points falling within a visual field of the virtual user is greater than a preset threshold.

Optionally, the method includes: performing a corresponding interactive operation on the display information played back in the information playback layer in response to a playback control command of a user. Optionally, the performing the corresponding interactive operation on the display information played back in the information playback layer in response to the playback control command of the user includes: setting an interactive button on the information playback layer, and performing the corresponding interactive operation on the display information in response to the playback control command input by the user through the interactive button; wherein the interactive operation includes: one or more of pause, playback, switch and playback rate conversion.

Optionally, the method includes: controlling display information played back in the information playback layer in each display area to be different if the plurality of display areas are identified in the 3D model.

Optionally, the method includes: determining target display areas corresponding to a plurality of 3D models and needing to play back the display information if a user browses the plurality of 3D models in a present time interval, and controlling display information played back in an information playback layer in each target display area to be different.

Optionally, the display information includes: a static image, streaming media information, or a human-computer interaction interface.

Optionally, the display position information includes spatial coordinates of end points of the display area in the 3D model, and the method further includes: dividing the display area determined based on the spatial coordinates of the end points into a plurality of sub display areas; dividing the display information for being played back in the display area into a plurality of sub display information in one-to-one correspondence to the plurality of sub display areas on a display position; and controlling to display the corresponding sub display information in each sub display area.

Another aspect of an embodiment of the present disclosure provides an information playback apparatus, including: a display area identification module, configured to perform identification on a spatial image in a 3D model and obtain an information display device and a display area in the spatial image; a display position determining module, configured to determine display position information corresponding to the display area; and a display information playback module, configured to overlay an information playback layer in the display area based on the display position information so as to play back display information in the information playback layer.

Optionally, the display area identification module is configured to input the 3D model into an image identification model, identify the information display device and the display area in the spatial image by using the image identification model, and determine positions of the information display device and the display area in the 3D model.

Optionally, the display area identification module is configured to generate a training sample based on a 3D model sample in which 3D space information of the information display device is calibrated, wherein the display area is calibrated in the 3D space information of the information display device; and train a preset deep learning model by using a deep learning method and based on the training sample to obtain the image identification model.

Optionally, the display position determining module is configured to obtain 3D point cloud information corresponding to the 3D model; and determine the display position information based on the 3D point cloud information and a position of the display area in the 3D model, wherein the display position information includes: spatial coordinates in the 3D model.

Optionally, the display information playback module is configured to obtain current virtual user visual field information, wherein the visual field information includes current position information of a virtual user and visual angle range information of the virtual user; judge whether the information display device is within a visual field range of the virtual user; and load the display information on the information playback layer and play back automatically, or play back in response to a playback command of a user if the information display device is located within the visual field range of the virtual user.

Optionally, the display information playback module is further configured to obtain spatial coordinates of end points of the information display device in the 3D model; and determine that the information display device is within the visual field range of the virtual user when the number of the spatial coordinates of the end points falling within a visual field of the virtual user is greater than a preset threshold.

Optionally, a display information interaction module is configured to perform a corresponding interactive operation on the display information played back in the information playback layer in response to a playback control command of a user.

Optionally, the display information interaction module is configured to set an interactive button on the information playback layer, and perform the corresponding interactive operation on the display information in response to the playback control command input by the user through the interactive button; wherein the interactive operation includes: one or more of pause, playback, switch and playback rate conversion.

Optionally, the display information playback module is configured to control display information played back in the information playback layer in each display area to be different if the plurality of display areas are identified in the 3D model.

Optionally, the display information playback module is configured to determine target display areas corresponding to a plurality of 3D models and needing to play back the display information if a user browses the plurality of 3D models in a present time interval, and control display information played back in an information playback layer in each target display area to be different.

Optionally, the display position information includes spatial coordinates of end points of the display area in the 3D model, and the apparatus further includes: a display information controlling module, wherein the display information controlling module is configured to: divide the display area determined based on the spatial coordinates of the end points into a plurality of sub display areas; divide the display information for being played back in the display area into a plurality of sub display information in one-to-one correspondence to the plurality of sub display areas on a display position; and control to display the corresponding sub display information in each sub display area.

According to another aspect of an embodiment of the present disclosure, a computer readable storage medium is provided. The computer readable storage medium stores a computer program, and the computer program is configured to execute the above information playback method.

According to yet another aspect of an embodiment of the present disclosure, an electronic device is provided, including: a processor; and a memory configured to store executable instructions of the processor. The processor is configured to read the executable instructions from the memory, and execute the instructions to implement the above information playback method.

According to yet another aspect of an embodiment of the present disclosure, a computer program product is provided, including: a readable medium containing executable instructions, wherein these executable instructions, when executed, may cause a machine to execute the above information playback method.

Based on the information playback method and apparatus, the computer readable storage medium, and the electronic device provided by the above embodiments of the present disclosure, by performing identification on the spatial image in the 3D model, the information display device and the display area in the spatial image are obtained, the display position information corresponding to the display area is determined, the information playback layer is overlaid in the display area and the display information is played back, and the corresponding interactive operation is performed on the display information played back in the information playback layer. By overlaying the information playback layer on the information display device in the 3D model, further information exchange can be implemented in the 3D model, so that the user can experience a more reality-like scenario in the 3D model, thereby enhancing user experience.

The technical solutions of the present disclosure will be further described in detail below through accompanying drawings and the embodiments.

BRIEF DESCRIPTION OF DRAWINGS

The above and other objectives, features and advantages of the present disclosure will become more apparent from the more detailed description of the embodiments of the present disclosure with reference to accompanying drawings. The accompanying drawings are configured to provide a further understanding of the embodiments of the present disclosure, constitute a part of the specification, are configured to explain the present disclosure together with the embodiments of the present disclosure, and do not limit the present disclosure. In the accompany drawings, the same reference numerals generally represent the same components or steps.

DETAILED DESCRIPTION OF THE EMBODIMENTS

Exemplary embodiments according to the present disclosure will be described in detail below with reference to accompanying drawings. Obviously, the described embodiments are only part of the embodiments of the present disclosure, but not all the embodiments. It should be understood that the present disclosure is not limited by the exemplary embodiments described herein.

It should be noted that relative arrangement of components and steps, numerical expressions and numerical values set forth in these embodiments do not limit the scope of the present disclosure unless specifically stated otherwise.

Those skilled in the art can understand that terms such as "first" and "second" in the embodiments of the present disclosure are only configured to distinguish different steps, devices, or modules, etc., and neither represent any specific technical meaning, nor represent any necessary logical order between them.

It should further be understood that, in the embodiments of the present disclosure, "a plurality of" may refer to two or more, and "at least one" may refer to one, two or more.

It should further be understood that any component, data or structure mentioned in the embodiments of the present disclosure can generally be understood to be one or more in a case of not being explicitly defined or given contrary indications in the context.

In addition, a term "and/or" in the present disclosure is only an association relationship to describe associated objects, and represents that there may be three kinds of relationships, for example, A and/or B, may represent: A exists alone, A and B exist at the same time, and B exists alone. In addition, a character "/" in the present disclosure generally represents that the previous and next association objects are in an "or" relationship.

It should further be understood that the description of all the embodiments in the present disclosure emphasizes the differences between all the embodiments, and the same or similar points can be referred to each other. Repetitions are omitted for the sake of brevity.

Meanwhile, it should be understood that, for the convenience of description, dimensions of various parts shown in the accompanying drawings are not drawn in an actual proportional relationship.

The following description of the exemplary embodiments is merely illustrative in nature and is in no way intended to limit the present disclosure, its application or use in any way.

Technologies, methods, and devices known to those of ordinary skill in the related art may not be discussed in detail, but where appropriate, such technologies, methods, and devices should be considered part of the specification.

It should be noted that similar numerals and letters represent like items in the following accompanying drawings, therefore, once an item is defined in one accompanying drawing, it does not require further discussion in the subsequent accompanying drawings.

The embodiments of the present disclosure may be applied to electronic devices such as a computer system and a server, which may operate with numerous other general purpose or special purpose computing system environments or configurations. Examples of well-known computing systems, environments and/or configurations suitable for use with the electronic devices such as a terminal device, the computer system and the server include, but are not limited to: a personal computer system, a server computer system, a thin client, a thick client, a handheld or laptop device, a microprocessor-based system, a set-top box, programmable consumer electronics, a network personal computer, a minicomputer system, a mainframe computer system, and a distributed cloud computing technology environment including any of the above system, etc.

The electronic devices such as the computer system and the server may be described in a general context of computer system-executable instructions (such as program modules) executed by the computer system. Generally, the program modules may include a routine, a program, a target program, a component, logic, a data structure, etc., that execute particular tasks or implement particular abstract data types. The computer system/server may be implemented in the distributed cloud computing environment where tasks are executed by a remote processing device linked through a communications network. In the distributed cloud computing environment, the program modules may be located on a local or remote computing system storage medium including a storage device.

Application Overview

At present, an Internet technology has brought a lot of convenience to people's life. By using a 3D reconstruction technology, people can experience operations such as shopping, traveling, visiting, and viewing houses without leaving home. Furthermore, in a reconstructed 3D model, a user can be provided with a user experience that is basically the same as an actual scenario. However, as people use a 3D reconstruction scenario more and more, requirements for interaction in the 3D scenario are getting higher and higher. At present, the current technology lacks interaction when the user browses, and cannot provide the user with more diverse interaction based on the 3D scenario, resulting in very poor user experience.

According to an information playback method provided by an embodiment of the present disclosure, identification is performed on a spatial image in a 3D model and an information display device and a display area in the spatial image are obtained, display position information corresponding to the display area is determined, an information playback layer is overlaid in the display area and display information is played back, and a corresponding interactive operation is performed on the display information played back in the information playback layer. By overlaying the information playback layer on the information display device in the 3D model, further information exchange can be implemented in the 3D model, so that the user can experience a more reality-like scenario in the 3D model, thereby enhancing a user experience.

Exemplary System

Figure 1:
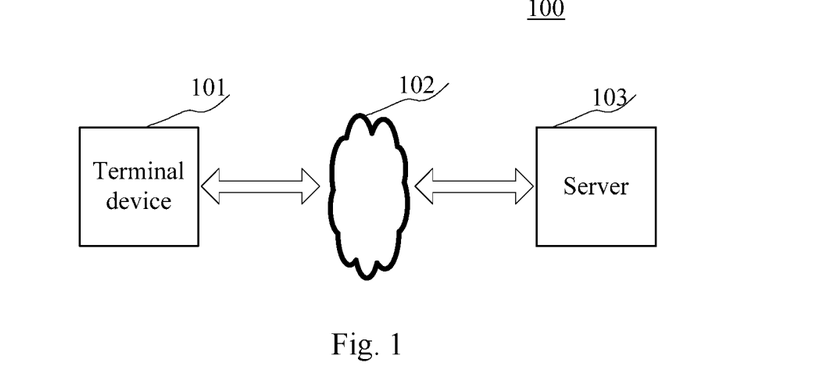
FIG. 1 is a diagram of a system to which the present disclosure is applicable.

FIG. 1 illustrates an exemplary system architecture 100 of an information playback method or information playback apparatus to which embodiments of the present disclosure may be applied. As shown in FIG. 1, the system architecture 100 may include a terminal device 101, a network 102 and a server 103. The network 102 is a medium used to provide a communication link between the terminal device 101 and the server 103. The network 102 may include various connection types, such as wired and wireless communication links, or fiber optic cables.

A user may use the terminal device 101 to interact with the server 103 through the network 102 to receive or send messages and the like. Various communication client applications, such as shopping applications, search applications, web browser applications, and instant communication tools, may be installed on the terminal device 101.

The terminal device 101 may be various electronic devices, including but not limited to, mobile terminals such as a mobile phone, a notebook computer, a digital broadcast receiver, a personal digital assistant (PDA), a PAD (Tablet), a portable multimedia player (PMP), and a vehicle-carried terminal (for example, a vehicle-carried navigation terminal), and stationary terminals such as a digital TV and a desktop computer.

The server 103 may be a server that provides various services, such as a background image processing server that processes images uploaded by the terminal device 101. The background image processing server can process the received image, obtain a processing result (such as object suggestion information) and feed it back to the terminal device.

It should be noted that the information playback method provided by the embodiment of the present disclosure may be executed by the server 103 or the terminal device 101. Accordingly, the information playback apparatus may be set in the server 103 or in the terminal device 101. For example, there may be the plurality of terminal devices 101 in FIG. 1, wherein one terminal device obtains a spatial image from other terminal devices, and executes the information playback method. It should be understood that the numbers of the terminal devices, networks and servers in FIG. 1 are merely illustrative. There may be any number of terminal devices, networks and servers according to implementation needs.

Exemplary Method

Figure 2:
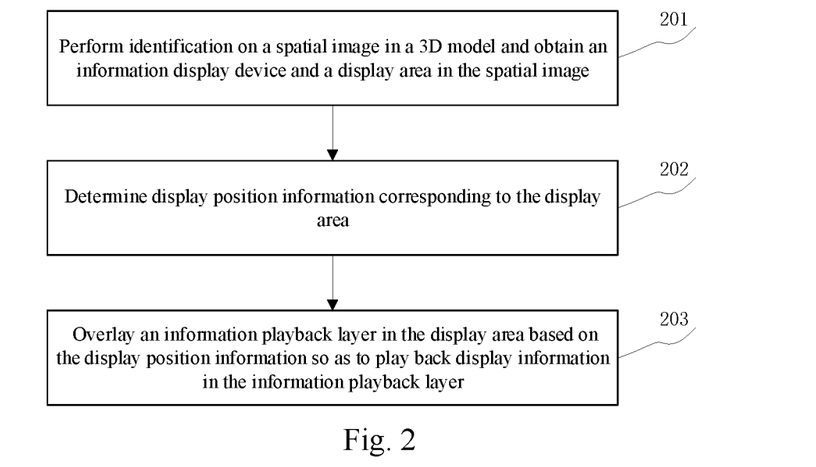
FIG. 2 is a flow chart in one embodiment of an information playback method of the present disclosure.

FIG. 2 is a flow chart in one embodiment of an information playback method of the present disclosure. The present embodiment may be applied to an electronic device (such as the server or the terminal device as shown in FIG. 1). As shown in FIG. 2, the following steps are included.

Step 201, identification is performed on a spatial image in a 3D model and an information display device and a display area of the information display device in the spatial image are obtained. In one embodiment, the 3D model may be a 3D model of a house, and the like. The electronic device may perform identification on the spatial image in the 3D model displayed by a target user terminal (for example, the terminal device shown in FIG. 1). Where, the target user terminal is a terminal used by a target user, and the target user is a user who browses a 3D space. The spatial image may be an image captured in advance for the 3D space such as the house, an ordinary two-dimensional image, or a panoramic image. The spatial image may include various object images. For example, when the spatial image is an image captured in a room, the spatial image may include images of various furniture, such as images of sofa, a tea table, a television, and a dining table.

For the spatial image with the various furniture, the electronic device may determine object information in the spatial image by using various methods. For example, the electronic device may use an existing target detection method (for example, a target detection method based on a neural network) to identify the spatial image, and obtain the information display device and the display area in the spatial image. The information display device may be a preset device capable of performing a display operation, such as a television, a display and a projector screen. The display area is a display area of the television, the display, a screen, etc., for example, a screen area of the television. Further, the information display device may further include some specific areas on a flat surface, such as some specific areas on a wall, for example, an area drawn on the wall; all of a mirror surface or glass surface; or some specific areas. The information display device may include any 3D model surface of an object that can be used as a display interface in a real physical world.

Step 202, display position information corresponding to the display area is determined.

In one embodiment, the display position information corresponding to the display area may include spatial coordinates of four end points (vertices) of the display area in the 3D model, and the like. Step 203, an information playback layer is overlaid in the display area based on the display position information so as to play back display information in the information playback layer.

In one embodiment, the information playback layer is overlaid in the display area, and the information playback layer is configured to play back the display information. The display information may include one or more of a static image with a predetermined resolution, streaming media information, or a human-computer interaction interface, which is not limited in the present disclosure. For example, a position where a video should be pasted is determined by display position information of the display area of the television, and then the video is pasted on the display area of the television in the 3D model, so that a virtual television in the 3D model has a function of playing back the video and becomes a real television.

In one embodiment, a corresponding interactive operation is performed on the display information played back in the information playback layer in response to a playback control command of a user. The playback control command of the user may be pause, playback, switch, and playback rate conversion, etc. The corresponding interactive operation such as pause, playback, switch, and playback rate conversion is performed on the display information played back in the information playback layer in response to the playback control command of the user. For example, the television in the 3D space is made to play back the video and the interactive operation is newly added, so that the user may interact with the video played back by the television, and thus the user has a more immersive feeling.

An interactive button may be set on the information playback layer. The performing the corresponding interactive operation on the display information in response to the playback control command input by the user through the interactive button includes: one or more of pause, playback, switch and playback rate conversion.

Figure 3:
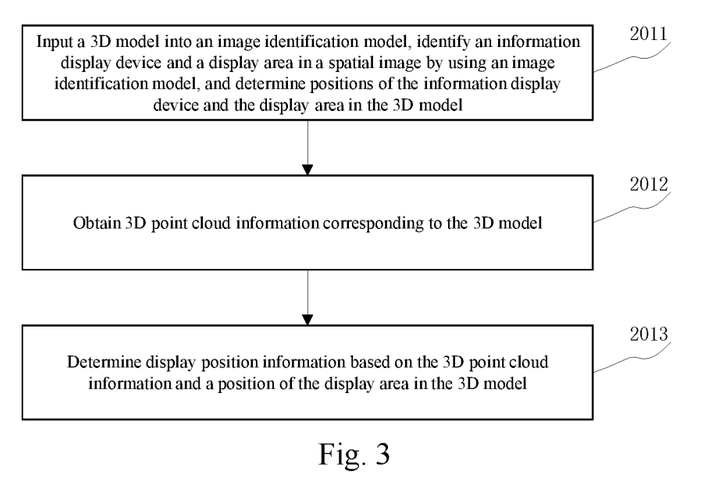
FIG. 3 is a flow chart of determining a display position in one embodiment of an information playback method of the present disclosure.

In some optional implementations, FIG. 3 is a flow chart of determining a display position in one embodiment of the information playback method of the present disclosure. As shown in FIG. 3, the following steps are included.

Step 2011, the 3D model is input into an image identification model, the information display device and the display area are identified in the spatial image by using the image identification model, and positions of the information display device and the display area in the 3D model are determined. In one embodiment, the image identification model may be a deep learning model, and there are various kinds of deep learning models, for example, the deep learning models include CNN, DBN, RNN, RNTN, an auto-encoder, GAN, and the like. A preset deep learning model includes three layers of neuron models. The three layers of neuron models include an input layer neuron model, an intermediate layer neuron model, and an output layer neuron model. Output of each layer of neuron models is taken as input of the next layer of neuron model. The three layers of neuron models may be a sub network structure of a plurality of neural network layers with a fully-connected structure, and the intermediate layer neuron model is a fully-connected layer.

A training sample is generated based on a 3D model sample in which 3D space information (including depth information) of the information display device is calibrated, the display area is calibrated in the 3D space information of the information display device, and the 3D space information trains a preset deep learning model by using a deep learning method and based on the training sample to obtain the image identification model. For example, a 3D model sample for calibrating the 3D space information of the information display device such as the television and the display, the display area is calibrated in the 3D space information of the information display device, the training sample is generated based on the 3D model sample, and after sufficient training is performed on the image identification model based on the training sample, the model can identify the information display device and the display area for any 3D model, and determine the positions of the information display device and the display area in the 3D model.

In one embodiment, the training sample may also be generated based on a panorama sample in which a position of an image of the information display device is calibrated, the display area is calibrated in the image of the information display device, and the preset deep learning model is trained by using the deep learning method and based on the training sample to obtain the image identification model. For example, a panorama sample for calibrating positions of images of the television and the display, the display area is calibrated in the image of the information display device, the training sample is generated based on the panorama sample, and after sufficient training is performed on the image identification model based on the training sample, the model can identify the information display device and the display area for any panorama, and determine positions of the information display device and the display area in the panorama.

In one embodiment, an executive body for training the image identification model may use a machine learning method to take a sample space image included in the training sample in a preset training sample set as input, and take a labeled object characteristic information (the object characteristic information may be configured to characterize appearance characteristics of an object, such as a category, style and other characteristics of the object) corresponding to the input sample space image as expected output to train an initial model (such as a convolutional neural network of various structures), and thus actual output can be obtained for the sample space image input during each training. Where, the actual output is data actually output by the initial model, which is configured to characterize the object characteristic information. Then, the above executive body may adjust parameters of the initial model by adopting a gradient descent method and a backpropagation method and based on the actual output and the expected output, and take a model obtained after each parameter adjustment as the initial model for the next training, and end training in a case of meeting a preset training end condition, so as to obtain the image identification model by training. It should be noted that the preset training end condition here may include, but is not limited to, at least one of the following: training time exceeds a preset duration; the number of training times exceeds the preset number of times; or a loss value calculated by using a preset loss function (such as a cross entropy loss function) is less than a preset loss value threshold.

Step 2012, 3D point cloud information corresponding to the 3D model is obtained.

In one embodiment, the 3D point cloud information may be obtained remotely or locally. The 3D point cloud information may include 3D coordinate values corresponding to pixels in the 3D model. For example, when building the 3D model, a depth camera is configured to capture the image of the 3D space such as the house to obtain the spatial image, and the spatial image is taken as the depth image, so that depth information corresponding to the spatial image can be obtained. The depth information is configured to characterize a distance between an object image in the spatial image and an imaging surface of a camera. Each pixel in the depth image corresponds to a depth value, and the depth value is configured to characterize a distance between a position indicated by the pixel and the imaging surface of the camera. The electronic device may determine the 3D point cloud information according to the distance characterized by the depth information.

Step 2013, the display position information is determined based on the 3D point cloud information and a position of the display area in the 3D model, wherein the display position information includes: spatial coordinates in the 3D model.

Figure 4:
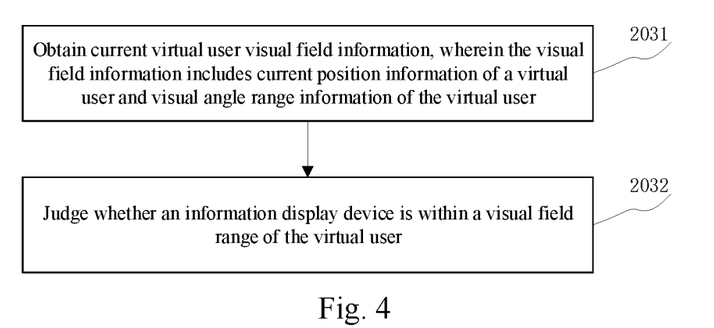
FIG. 4 is a flow chart of judging whether an information display device is within a visual field range in one embodiment of an information playback method of the present disclosure.

In one embodiment, each object image in the spatial image may correspond to a 3D point cloud set, and each 3D point cloud in the three-dimensional point cloud set is configured to characterize a point on the object. Spatial coordinates of each vertex of the display area of the information display device in the 3D model may be determined according to the 3D point cloud information and the position of the display area in the 3D model. For example, the television and the display screen of the television are identified through the image identification model, and position information of the display screen is determined. According to the 3D point cloud information and a position of the display screen in the 3D model, the spatial coordinates of the four vertices of the display screen in the 3D model are determined, and the specific position of the display screen of the television in the 3D model is determined by the four spatial coordinates. FIG. 4 is a flow chart of judging whether the information display device is within a visual field range in one embodiment of the information playback method of the present disclosure. As shown in FIG. 4, the following steps are included.

Step 2031, current virtual user visual field information is obtained, and the visual field information includes current position information of a virtual user and visual angle range information of the virtual user.

In one embodiment, the electronic device may determine the visual field information of the virtual user based on the position where the virtual user is located and a visual field range of the virtual user. When the user browses in the 3D model, there is always a virtual user simulating a real position of the user in the 3D model. Since a visual angle range of human eyes is a fixed angle, generally between 60° and 120°, and the 3D model seen by the user at different positions is also different, so the position and visual angle range of the virtual user need to be used to determine the visual field information of the virtual user.

Step 2032, whether the information display device is within the visual field range of the virtual user is judged.

In the present embodiment, the electronic device can obtain coordinate information of the object. In step 2031, the visual field information of the virtual user is obtained. After intersection processing is performed on the visual field information of the virtual user and the 3D model, the object information in the visual field range of the virtual user can be obtained.

In one embodiment, the electronic device obtains spatial coordinates of end points of the information display device in the 3D model; and determines that the information display device is within the visual field range of the virtual user when the number of the spatial coordinates of the end points falling within a visual field of the virtual user is greater than a preset threshold. For example, it can be set that if two end points of the information display device are within the visual field range of the virtual user, it is determined that the information display device is within the visual field range of the virtual user. That is, the threshold is set to be 2. Of course, the threshold may be set to be 3, 4, and other natural numbers according to the actual situation.

It may be understood that it is determined that the information display device is not within the visual field range of the virtual user when the number of the spatial coordinates of the end points falling within the visual field of the virtual user is smaller than or equal to the preset threshold. In this case, it may be set to temporarily not play back the display information. For example, once it is determined that the information display device is not within the visual field range of the virtual user, the playback of the display information will be paused, and the playback will be restarted when the display area can be seen in the visual field range of the virtual user. In this case, it may also be set that the display information is still played back, but the virtual user cannot see it due to the limitation of his/her visual field range.

A plurality of methods may be adopted to play back the display information in the information playback layer. For example, the current virtual user visual field information is obtained, whether the information display device is within the visual field range of the virtual user is judged; and the display information is loaded on the information playback layer and is played back automatically, or is played back in response to the playback command of the user if the information display device is located within the visual field range of the virtual user. The display information may be played back in two playback forms: automatic playback and manual triggering. For automatic playback, for example, when the user is browsing in the 3D model, the video in the television will automatically played back if the television in the 3D model is within a visible range of the user, or, if the television is within the visible range of the user, when the user clicks the television in the 3D model, the television can be triggered to play back.

A playback button is rendered on the information playback layer, and a corresponding playback operation is performed in response to the play button being triggered. An interactive button may be further rendered on the information playback layer to imitate a real player, and the user can perform clicking or other operations on the playback button to realize user interaction in the real space. For example, the interactive button such as pause, playback, switch, or playback rate conversion may be rendered, so that the user can interact with it to pause the video when playing back a picture, streaming media, or the human-computer interaction interface. Automatic pause and manual pause are included. For automatic pause: time for playing back the video may be customized through more specific policies. When a certain time is reached, the video will automatically pause. For manual pause: the user can manually click the television to pause playback. If the user doesn't manually click the television, the video will be subjected to loop playback.

In one embodiment, display information played back in the information playback layer in each display area is controlled respectively if the plurality of display areas are identified in the 3D model. The display information played back in the information playback layers in these display areas may all be the same, may all be different, or may be partially the same.

The situation that the plurality of display areas are identified in the 3D model may include the following: (1) the 3D model includes one display device, and the display device includes the plurality of display areas (for example, the display device is a multi-screen display device); and (2) the 3D model includes the plurality of display devices (for example, the 3D model includes the plurality of display devices such as the television, a computer display, and a home theater), and each display device includes the one or more display areas. For example, there are the plurality of televisions in the same 3D model, and the different televisions are controlled to play back the different videos.

Target display areas corresponding to the plurality of 3D models and needing to play back the display information are determined if a user browses the plurality of 3D models in a present time interval, and display information played back in an information playback layer in each target display area is controlled to be different. For example, if the user browses the plurality of 3D models (a 3D model of a house) within 30 minutes, the video played back by the television in each 3D model browsed by the user is different.

In one embodiment, the display position information includes spatial coordinates of end points (for example, four end points) of the display area in the 3D model. Based on the end points (four end points), a display plane (ie, the display area) for playing back the display information may be determined, but the determined display plane may be inclined, which may reduce viewing feeling of the user. In order to reduce the inclination of the user to see the display information (for example, an image), the following methods may be adopted.

First, the display area determined based on the spatial coordinates of the end point is divided into a plurality of sub display areas. For example, a rectangular display area is determined based on the four end points, and the rectangular display area is divided into the plurality of sub display areas. These sub display areas may be implemented as a plurality of strip-shaped sub-areas or a plurality of triangular sub-areas or a plurality of block-shaped sub-areas. These sub-areas may have the same size or different sizes. For example, according to specific display requirements, the sub-areas include a small number of sparse sub-areas and a large number of dense sub-areas.

Then, the display information for being played back in the display area is divided into a plurality of sub display information in one-to-one correspondence to the plurality of sub display areas on a display position. For example, if the display area has been divided into the plurality of strip-shaped sub-areas in the above step, an image to be displayed is divided into a plurality of strip-shaped sub-images in one-to-one correspondence to the plurality of strip-shaped sub-areas on position.

Then, the corresponding sub display information is controlled to display in each sub display area. For example, the leftmost sub-image is displayed in the leftmost sub display area, the middle sub-image is displayed in the middle sub display area, and the rightmost sub-image is displayed in the rightmost sub display area.

In this way, in a case that the determined display area (display plane) may be inclined, the inclination of the displayed information seen by the virtual user can be greatly reduced by means of displaying in different areas, which improves the viewing feeling of the user and enhances the user experience.

Exemplary Apparatus

Figure 5A:
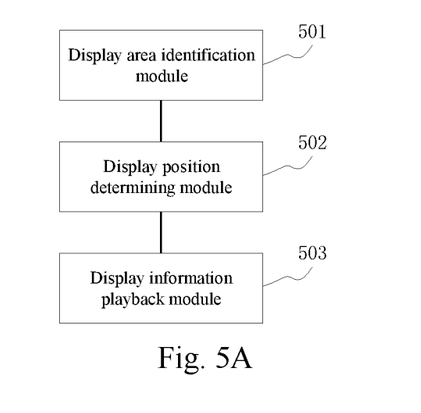
FIG. 5A is a schematic structural diagram of one embodiment of an information playback apparatus of the present disclosure.

In one embodiment, as shown in FIG. 5A, the present disclosure provides an information playback apparatus, including: a display area identification module 501, a display position determining module 502, a display information playback module 503 and a display information interaction module 504. The display area identification module 501 performs identification on a spatial image in a 3D model and obtains an information display device and a display area of the information display device in the spatial image. The display position determining module 502 determines display position information corresponding to the display area. The display information playback module 503 overlays an information playback layer in the display area based on the display position information so as to play back display information in the information playback layer.

Figure 5B:
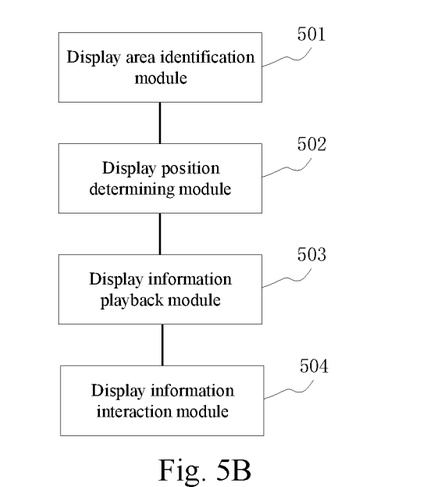
FIG. 5B is a schematic structural diagram of another embodiment of an information playback apparatus of the present disclosure.

As shown in FIG. 5B, the information playback apparatus further includes a display information interaction module 504, configured to perform a corresponding interactive operation on the display information played back in the information playback layer in response to a playback control command of a user.

In one embodiment, the display area identification module 501 inputs the 3D model into an image identification model, identifies the information display device and the display area in the spatial image by using the image identification model, and determines positions of the information display device and the display area in the 3D model. The display area identification module 501 generates a training sample based on a 3D model sample in which the information display device is calibrated, wherein the display area is calibrated in the information display device. The display area identification module 501 trains a preset deep learning model by using a deep learning method and based on the training sample to obtain the image identification model.

The display position determining module 502 obtains 3D point cloud information corresponding to the 3D model, and determines the display position information based on the 3D point cloud information and a position of the display area in the 3D model, wherein the display position information includes: spatial coordinates in the 3D model.

The display information playback module 503 obtains current virtual user visual field information, and the visual field information includes current position information of a virtual user and visual angle range information of the virtual user. The display information playback module 503 judges whether the information display device is within a visual field range of the virtual user, and loads the display information on the information playback layer and plays back automatically, or plays back in response to a playback command of a user if the information display device is located within the visual field range of the virtual user.

The display information playback module 503 obtain spatial coordinates of end points of the information display device in the 3D model, and determines that the information display device is within the visual field range of the virtual user when the number of the spatial coordinates of the end points falling within a visual field of the virtual user is greater than a preset threshold.

In one embodiment, the display information interaction module 504 sets an interactive button on the information playback layer, and performs the corresponding interactive operation on the display information in response to the playback control command input by the user through the interactive button; wherein the interactive operation includes: one or more of pause, playback, switch and playback rate conversion.

The display information playback module 503 controls display information played back in the information playback layer in each display area to be different if the plurality of display areas are identified in the 3D model. The display information playback module 503 determines target display areas corresponding to the plurality of 3D models and needing to play back the display information if a user browses the plurality of 3D models in a present time interval, and controls display information played back in an information playback layer in each target display area to be different.

The information playback apparatus may further include a display information controlling module, which contains a display control strategy. In some cases, based on the end points (for example, four end points), a display plane (i.e., the display area) for playing back the display information may be determined, but the determined display plane may be inclined, which may reduce viewing feeling of the user. The display control strategy contained in the display information controlling module can reduce inclination of the display information (for example, an image) seen by the user.

The display information controlling module is constructed as to divide the display area determined based on the spatial coordinates of the end points into a plurality of sub display areas; divide the display information for being played back in the display area into a plurality of sub display information in one-to-one correspondence to the plurality of sub display areas on a display position; and control to display the corresponding sub display information in each sub display area. In this way, in a case that the determined display area (display plane) may be inclined, the display information controlling module can greatly reduce the inclination of the displayed information seen by the virtual user by means of displaying in different areas, which improves the viewing feeling of the user and enhances the user experience.

Figure 6:
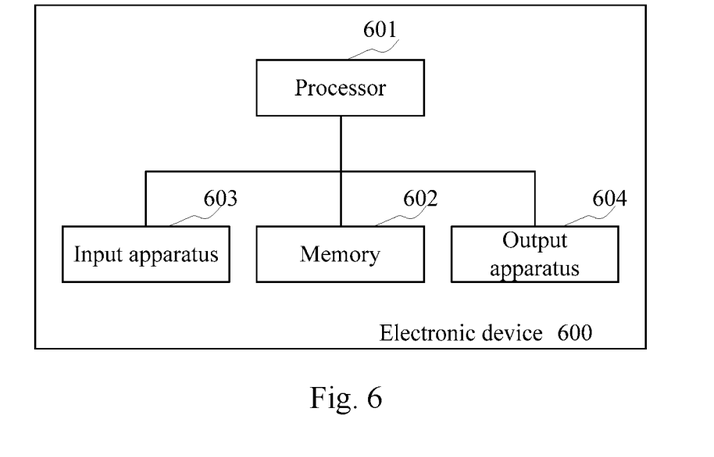
FIG. 6 is a structure diagram of one embodiment of an electronic device of the present disclosure.

FIG. 6 is a structure diagram of one embodiment of an electronic device of the present disclosure. As shown in FIG. 6, the electronic device 61 includes one or more processors 611 and a memory 612.

The processor 611 may be a central processing unit (CPU) or other forms of processing units having a data processing capability and/or instruction execution capability, and may control other components in the electronic device 61 to execute expected functions.

The memory 612 may include one or more computer program products, which may include various forms of computer readable storage media, such as a volatile memory and/or a non-volatile memory. The volatile memory for example, may include: a random access memory (RAM) and/or cache memory (cache), etc. The non-volatile memory, for example, may include: a read only memory (ROM), a hard disk, a flash memory, etc. One or more computer program instructions may be stored on the computer readable storage medium, and the processor 611 may run the program instructions so as to implement the information playback method and/or other expected functions of all the embodiments of the present disclosure above. Various contents such as an input signal, signal component, and noise component may also be stored in the computer readable storage medium.

In one example, the electronic device 61 may further include: an input apparatus 613 and an output apparatus 614, and the like, and these components are interconnected through a bus system and/or other forms of connection mechanisms (not shown). In addition, the input apparatus 613 may also include, for example, a keyboard, a mouse, and the like. The output apparatus 614 may output various information to the outside. The output apparatus 614 may include, for example, a display, a speaker, a printer, a communication network and their connected remote output devices, etc.

Of course, for simplicity, only some of the components in the electronic device 61 related to the present disclosure are shown in FIG. 6, and components such as a bus and an input/output interface are omitted. Besides, the electronic device 61 may further include any other suitable components according to the specific application.

In addition to the above method and device, an embodiment of the present disclosure further provides a computer program product including a machine-readable medium, and the machine-readable medium includes computer program instructions (codes) that cause a machine to execute various operations of the above information playback method. For example, the computer program instructions, when run by the processor, cause the processor to execute the steps in the information playback method according to various embodiments of the present disclosure described in the "Exemplary Method" section above in this specification.

The computer program products may write program codes for executing operations of the embodiments of the present disclosure in any combination of one or more programming languages. The programming languages include object-oriented programming languages, such as Java and C++, and further include conventional procedural programming languages, such as the "C" language or similar programming languages. The program codes may be executed entirely on a user computing device, partly on the user device, as a stand-alone software package, partly on the user computing device and partly on a remote computing device, or entirely on the remote computing device or a server.

In addition, the embodiment of the present disclosure may further be a computer readable storage medium which stores computer program instructions. The computer program instructions, when run by the processor, cause the processor to execute the steps in the information playback method according to various embodiments of the present disclosure described in the "Exemplary Method" section above in this specification.

The computer readable storage medium may adopt any combination of one or more readable mediums. The readable medium may be a readable signal medium or a readable storage medium. The readable storage medium may include, for example, but not limited to, electrical, magnetic, optical, electromagnetic, infrared, or semiconductor systems, apparatuses or devices, or combination of the any above. More specific examples (non-exhaustive list) of the readable storage medium may include: electrical connection having one or more wires, a portable disk, a hard disk, a random access memory (RAM), a read only memory (ROM), an erasable programmable read only memory (EPROM or a flash memory), a fiber optic, a portable compact disk read only memory (CD-ROM), an optical storage device, a magnetic storage device, or any suitable combination of the above.

The basic principle of the present disclosure is described above with reference to the specific embodiments. However, it should be pointed out that the merits, advantages, effects, and the like mentioned in the present disclosure are only examples rather than limitations, and these merits, advantages, effects and the like should not be considered to be a must-have for each embodiment of the present disclosure. In addition, the specific details disclosed above are only for the purpose of example and easy understanding, but not for limitation, and the above details do not limit the present disclosure to be implemented by adopting the above specific details.

Based on the information playback method and device, the electronic device and the storage medium in the above embodiments, the information display device and the display area in the 3D model are identified, the information playback layer is overlaid in the display area based on the position information of the display area and the display information is played back, and the corresponding interactive operation is performed on the display information played back in the information playback layer. By overlaying the information playback layer on the information display device in the 3D model, information exchange in the 3D model is implemented, so that the user can experience the more reality-like scenario in the 3D model, thereby enhancing the user experience.

All the embodiments in the specification are described in a progressive manner, and each embodiment focuses on the differences from other embodiments, and the same or similar parts between all the embodiments may be referred to each other. As for the system embodiment, since it basically corresponds to the method embodiment, the description is relatively simple, and relevant parts refer to the partial illustration in the method embodiments.

The block diagrams of elements, apparatus, devices, and systems involved in the present disclosure are merely illustrative examples and are not intended to require or imply that they must be connected, arranged, or configured in the manner shown in the block diagrams. Those skilled in the art will appreciate that these elements, apparatus, devices, and systems may be connected, arranged, and configured in any manner. Words such as "including", "containing", "having," and the like, are open-ended words, and refer to and may be used interchangeably with "including but not limited to". The words "or" and "and" used here refer to and may be used interchangeably with the word "and/or", unless the context clearly dictates otherwise. The word "such as" used here refers to and may be used interchangeably with the phrase "such as but not limited to".

The method and apparatus of the present disclosure may be implemented in many ways. For example, the method and apparatus of the present disclosure may be implemented in software, hardware, firmware, or any combination of the software, hardware, and firmware. The above order for the steps of the method is for illustration only, and the steps of the method of the present disclosure are not limited to the order specifically described above unless specifically stated otherwise. In addition, in some embodiments, the present disclosure can further be implemented as programs recorded in a recording medium, and these programs include machine-readable instructions for implementing the method according to the present disclosure. Thus, the present disclosure further covers the recording medium storing the program for executing the method according to the present disclosure.

It should further be noted that, in the apparatus, device and method of the present disclosure, all the components or all the steps may be decomposed and/or recombined. These decompositions and/or recombinations should be regarded as equivalent solutions of the present disclosure.

The above description of the disclosed aspects is provided to enable any person skilled in the art to make or use the present disclosure. Various modifications and the like to these aspects are readily apparent to those skilled in the art, and the general principle defined here may be applied to other aspects without departing from the scope of the present disclosure. Thus, the present disclosure is not intended to be limited to the aspects shown here but is to be in accordance with the widest scope consistent with the principle and novel features disclosed herein.

The above description has been presented for the purposes of illustration and description. In addition, this description is not intended to limit the embodiments of the present disclosure to the forms disclosed here. Although a plurality of example aspects and embodiments have been discussed above, those skilled in the art will recognize certain variations, modifications, changes, additions and sub-combinations thereof.

The invention claimed is:

1. An information playback method, comprising:
   performing identification on a spatial image in a 3D model, thereby identifying an information display device and a display area of the information display device in the spatial image;
   determining display position information corresponding to the display area; and
   overlaying an information playback layer in the display area based on the display position information so as to play back display information in the information playback layer;
   wherein playing back the display information in the information playback layer comprises:
      obtaining current virtual user visual field information, wherein the visual field information comprises current position information of a virtual user and visual angle range information of the virtual user;
      judging whether the information display device is within a visual field range of the virtual user; and
      loading the display information on the information playback layer and playing back automatically, or playing back in response to a playback command of a user if the information display device is located within the visual field range of the virtual user; and
   wherein judging whether the information display device is within the visual field range of the virtual user comprises:
      obtaining spatial coordinates of end points of the information display device in the 3D model; and
      determining that the information display device is within the visual field range of the virtual user when the number of the spatial coordinates of the end points falling within the visual field of the virtual user is greater than a preset threshold.

2. The method according to claim 1, wherein performing the identification on the spatial image in the 3D model and thereby identifying the information display device and the display area in the spatial image comprise:
   inputting the 3D model into an image identification model, identifying the information display device and the display area of the display device in the spatial image by using the image identification model, and determining positions of the information display device and the display area in the 3D model.

3. The method according to claim 2, further comprising:
   generating a training sample based on a 3D model sample in which 3D space information of the information display device is calibrated, wherein the display area of the information display device is calibrated in the 3D space information of the information display device; and
   training a preset deep learning model by using a deep learning method and based on the training sample to obtain the image identification model.

4. The method according to claim 1, wherein determining the display position information corresponding to the display area comprises:
   obtaining 3D point cloud information corresponding to the 3D model; and
   determining the display position information based on the 3D point cloud information and a position of the display area in the 3D model; wherein
   the display position information comprises spatial coordinates of end points of the display area in the 3D model.

5. The method according to claim 1, further comprising:
   performing a corresponding interactive operation on the display information played back in the information playback layer in response to a playback control command of a user.

6. The method according to claim 1, further comprising:
   respectively controlling the display information played back in the information playback layer of each display area in a case that the identified display area comprises the plurality of display areas, wherein
   optionally, respectively controlling the display information played back in the information playback layer of each display area comprises: controlling to play back different display information in the information playback layer of each display area.

7. The method according to claim 1, further comprising:
   determining target display areas corresponding to a plurality of 3D models and needing to play back the display information in a case that a user browses the plurality of 3D models, and respectively controlling display information played back in an information playback layer of each target display area, wherein
   optionally, respectively controlling the display information played back in the information playback layer of each target display area comprises: controlling to play back different display information in the information playback layer of each target display area.

8. The method according to claim 1, wherein the display information comprises at least one of the following items: a static image, streaming media information, or a human-computer interaction interface.

9. The method according to claim 1, wherein the display position information comprises spatial coordinates of end points of the display area in the 3D model, and the method further comprises:
dividing the display area determined based on the spatial coordinates of the end points into a plurality of sub display areas;
dividing the display information for being played back in the display area into a plurality of sub display information in one-to-one correspondence to the plurality of sub display areas on a display position; and
controlling to display the corresponding sub display information in each sub display area.

10. An electronic device, comprising:
a processor; and
a memory, configured to store executable instructions of the processor;
wherein the processor is configured to read the executable instructions from the memory, and execute the instructions so as to implement the following operations:
perform identification on a spatial image in a 3D model and thereby identify an information display device and a display area of the information display device in the spatial image;
determine display position information corresponding to the display area; and
overlay an information playback layer in the display area based on the display position information so as to play back display information in the information playback layer;
wherein the processor is configured to obtain current virtual user visual field information, wherein the visual field information comprises current position information of a virtual user and visual angle range information of the virtual user; judge whether the information display device is within a visual field range of the virtual user; and load the display information on the information playback layer and play back automatically, or play back in response to a playback command of a user if the information display device is located within the visual field range of the virtual user; and
wherein the processor is further configured to obtain spatial coordinates of end points of the information display device in the 3D model; and determine that the information display device is within the visual field range of the virtual user when the number of the spatial coordinates of the end points falling within a visual field of the virtual user is greater than a preset threshold.

11. The electronic device according to claim 10, wherein the processor is configured to input the 3D model into an image identification model, identify the information display device and the display area of the information display device in the spatial image by using the image identification model, and determine positions of the information display device and the display area in the 3D model.

12. The electronic device according to claim 11, wherein the processor is configured to generate a training sample based on a 3D model sample in which 3D space information of the information display device is calibrated, wherein the display area of the information display device is calibrated in the 3D space information of the information display device; and train a preset deep learning model by using a deep learning method and based on the training sample to obtain the image identification model.

13. The electronic device according to claim 10, wherein the display position determining module is configured to obtain 3D point cloud information corresponding to the 3D model; and determine the display position information based on the 3D point cloud information and a position of the display area in the 3D model, wherein the display position information comprises: spatial coordinates of end points of the display area in the 3D model.

14. The electronic device according to claim 10, wherein the processor is further configured to perform a corresponding interactive operation on the display information played back in the information playback layer in response to a playback control command of a user.

15. The electronic device according to claim 10, wherein the processor is configured to respectively control the display information played back in the information playback layer of each display area in a case that the identified display area comprises the plurality of display areas, wherein
optionally, respectively controlling the display information played back in the information playback layer of each display area comprises: controlling to play back different display information in the information playback layer of each display area.

16. The electronic device according to claim 10, wherein the processor is configured to determine target display areas corresponding to a plurality of 3D models and needing to play back the display information in a case that a user browses the plurality of 3D models, and respectively control display information played back in an information playback layer of each target display area, wherein
optionally, respectively controlling the display information played back in the information playback layer of each target display area comprises: controlling to play back different display information in the information playback layer of each target display area.

* * * * *